US007369144B2

(12) United States Patent
Marchand et al.

(10) Patent No.: US 7,369,144 B2
(45) Date of Patent: May 6, 2008

(54) METHOD AND DEVICE FOR CORRECTING THE ROTATION OF A VIDEO DISPLAY

(76) Inventors: Benoît Marchand, 50, Rue Abbé Grégoire, 38000 Grenoble (FR); Benoît D'Halluin, 106, Rue des Contamines, 38420 Domene (FR)

( * ) Notice: Subject to any disclaimer, the term of this patent is extended or adjusted under 35 U.S.C. 154(b) by 0 days.

(21) Appl. No.: 10/409,530

(22) Filed: Apr. 8, 2003

(65) Prior Publication Data

US 2003/0189639 A1  Oct. 9, 2003

(30) Foreign Application Priority Data

Apr. 9, 2002 (FR) .................................. 02 04417

(51) Int. Cl.
*G09G 5/10* (2006.01)
(52) U.S. Cl. .................................... 345/692
(58) Field of Classification Search .................. 345/7, 345/506, 202, 501, 502, 512, 507–509, 32, 345/13, 84, 418, 421; 343/5; 340/705, 703; 315/371; 348/203, 139, 45, 180, 745, 442; 359/630; 382/284; 358/67, 488; 367/69
See application file for complete search history.

(56) References Cited

U.S. PATENT DOCUMENTS

| | | | | |
|---|---|---|---|---|
| 3,810,174 A | * | 5/1974 | Heard et al. .................. 342/185 |
| 4,214,269 A | * | 7/1980 | Parker et al. ................. 348/442 |
| 4,387,365 A | * | 6/1983 | Berry et al. .................. 708/442 |
| 4,388,619 A | * | 6/1983 | Beck .......................... 345/13 |
| 4,682,160 A | * | 7/1987 | Beckwith et al. ............. 345/421 |
| 4,736,348 A | * | 4/1988 | Bednarczyk ................. 367/69 |
| 4,847,603 A | * | 7/1989 | Blanchard ................... 345/7 |
| 5,138,435 A | * | 8/1992 | Shimada et al. ............. 348/383 |
| 5,436,655 A | * | 7/1995 | Hiyama et al. .............. 348/45 |
| 5,448,140 A | | 9/1995 | Douken et al. |
| 5,576,886 A | * | 11/1996 | Ferrante ..................... 359/630 |
| 5,627,565 A | * | 5/1997 | Morishita et al. ........... 345/158 |
| 5,757,341 A | * | 5/1998 | Clarke et al. ................ 345/32 |
| 5,790,273 A | * | 8/1998 | Horfarter .................... 358/461 |

(Continued)

FOREIGN PATENT DOCUMENTS

GB  2 291 771 A  1/1996

OTHER PUBLICATIONS

French Search Report from French Patent Application 02/04417, filed Apr. 9, 2002.

*Primary Examiner*—Prabodh Dharia
(74) *Attorney, Agent, or Firm*—Lisa K. Jorgenson; James H. Morris; Wolf, Greenfield & Sacks, P.C.

(57) ABSTRACT

A method for displaying a video image on a display screen by a scanning of the display screen along lines inclined by a first angle with respect to a reference direction by at least one electron beam modulated by a modulation signal. The method includes the steps of storing at least partly the successive initial digital video data associated with the image to be displayed in a memory; transmitting new successive digital video data corresponding to the image which would be displayed based on the stored initial digital video data for a scanning of the display screen along lines inclined with respect to the reference direction by a second angle opposite to the first angle; and providing the modulation signal based on the new transmitted successive digital video data.

11 Claims, 1 Drawing Sheet

U.S. PATENT DOCUMENTS

| | | | | |
|---|---|---|---|---|
| 5,841,439 | A * | 11/1998 | Pose et al. | 345/418 |
| 6,108,036 | A * | 8/2000 | Harada et al. | 348/219.1 |
| 6,122,045 | A * | 9/2000 | Pike et al. | 356/237.1 |
| 6,157,396 | A * | 12/2000 | Margulis et al. | 345/506 |
| 6,205,259 | B1 * | 3/2001 | Komiya et al. | 382/284 |
| 6,384,542 | B2 * | 5/2002 | Tsukamoto | 315/169.3 |
| 6,433,896 | B1 * | 8/2002 | Ueda et al. | 358/488 |
| 6,459,955 | B1 * | 10/2002 | Bartsch et al. | 700/245 |
| 6,590,606 | B1 * | 7/2003 | Hiller et al. | 348/203 |
| 6,616,444 | B2 * | 9/2003 | Andreiko et al. | 433/3 |
| 6,696,309 | B2 * | 2/2004 | Yamanaka et al. | 438/30 |
| 2001/0022858 | A1 * | 9/2001 | Komiya et al. | 382/274 |
| 2002/0013011 | A1 * | 1/2002 | Yamanaka et al. | 438/30 |
| 2002/0036617 | A1 * | 3/2002 | Pryor | 345/156 |
| 2002/0063807 | A1 * | 5/2002 | Margulis | 348/745 |
| 2002/0088940 | A1 * | 7/2002 | Watanabe et al. | 250/310 |
| 2002/0140817 | A1 * | 10/2002 | Biagiotti et al. | 348/180 |
| 2003/0189639 | A1 * | 10/2003 | Marchand et al. | 348/180 |
| 2004/0125103 | A1 * | 7/2004 | Kaufman et al. | 345/419 |
| 2004/0207625 | A1 * | 10/2004 | Griffin et al. | 345/440 |
| 2005/0129273 | A1 * | 6/2005 | Pryor | 382/103 |
| 2006/0033713 | A1 * | 2/2006 | Pryor | 345/158 |
| 2006/0221022 | A1 * | 10/2006 | Hajjar | 345/84 |

* cited by examiner

METHOD AND DEVICE FOR CORRECTING THE ROTATION OF A VIDEO DISPLAY

BACKGROUND OF THE INVENTION

1. Field of the Invention

The present invention relates to a method and a device for correcting the rotation of a video display.

2. Discussion of the Related Art

Generally, a video image is displayed on the screen of a display terminal by exciting phosphors arranged on the screen by means of one or several electron beams, emitted by electron guns. In the case of a color screen, a cathode-ray tube with three electron beams, each exciting a type of phosphor respectively emitting a red, green, or blue light, is generally used. The electron beams are modulated in intensity by modulation signals representative of the image to be displayed on screen.

Generally, the electron beams are focused at one point of the screen and are deviated together to scan screen lines. The electron beams scan the screen lines from the right to the left of the screen, returning to the left of the screen after the scanning of each line. The screen scanning is performed from the upper horizontal edge to the lower horizontal edge.

The electron beam deviations are obtained by two deflection coils, one horizontal deflection coil which controls the scanning of each screen line, and one vertical deflection coil which controls the deviations of the electron beams in the vertical direction.

The deflection coils may have certain defects of manufacturing and/or assembly on the display terminal. The magnetic fields of deviation of the electron beams induced by the deflection coils may then be such that the screen lines scanned by the electron beams are not perfectly horizontal while remaining parallel to one another. The image is then displayed on screen with a rotation angle equal to the inclination of the scanned lines.

A similar phenomenon occurs when the display terminal is placed in an external magnetic field, for example, the terrestrial magnetic field. The external magnetic field may disturb the electron beam deviation so that the scanned screen lines are slightly inclined with respect to the horizontal direction while remaining parallel to one another. The image is then displayed on screen with a rotation angle equal to the inclination of the scanned lines. The inclination angle of the lines depends on the orientation of the magnetic field and may vary if the display terminal is moved.

A conventional solution to this problem is to place a correction coil between the deflection terminals and the rear surface of the cathode-ray tube. The magnetic field induced by the correction coil is adjusted so that the scanned lines of the screen are horizontal. In other words, the correction field induced by the correction coil rotates the displayed image by a correction rotation angle, the sign and the amplitude of which are defined by the polarity and the intensity of the current flowing through the correction coil. The display terminal may include means for setting the current polarity and intensity to enable correcting the rotation defect once the display terminal has been installed.

The correction coil and the coil supply system amount to a non-negligible cost of the display terminal.

SUMMARY OF THE INVENTION

The present invention aims at providing a device and a method for displaying a video image enabling correction of an unwanted rotation of the displayed image, due to the inclination of the screen lines scanned by the electron beams, without adding any correction coil.

For this purpose, the invention provides a method for correcting the rotation of a video image display on a display screen by a scanning of the display screen according to lines inclined by a first angle with respect to a reference direction, the screen being scanned by at least one electron beam modulated by a modulation signal provided by a modulation system based on successive digital video data, comprising the steps of:

a) storing successive initial digital video data associated with the image to be displayed; and b) transmitting, to the modulation system, new successive digital video data determined from the successive initial digital video data, corresponding to the image which would be displayed based on the initial digital video data for a scanning of the display screen according to lines inclined with respect to the reference direction by a second angle opposite to the first angle.

According to an embodiment of the present invention, step b) comprises the steps of:

d) determining each of the new digital video data based on initial digital video data associated with distinct scanned lines of the screen; and e) successively transmitting to the modulation system, for each scanned line of the screen, the new digital video data associated with the scanning of a line of the display screen at the end of a dwell after the beginning of the line scanning.

According to an embodiment of the present invention, step d) comprises the repeating of the steps of extracting, from among the successive initial digital video data, first and second groups of successive initial digital video data comprising a determined number of successive initial digital video data and located at the same position in the sequence of successive initial digital video data associated with two successive scanned lines of the screen; and determining the determined number of new digital video data, each of the new digital video data corresponding to the weighting of one of the initial digital video data of the first group and of one of the initial digital video data of the second group.

According to an embodiment of the present invention, the number of successive initial digital video data of each group of successive initial digital video data is a function of the second angle.

According to an embodiment of the present invention, at step e), the dwell is a function of the scanned line and of the second angle.

The present invention also provides a device for displaying a video image on a display screen by a scanning of the display screen along lines inclined by a first angle with respect to a reference direction, the screen being scanned by at least one electron beam modulated by a modulation signal provided by a modulation system based on successive digital video data, comprising means for storing successive initial digital video data; means for providing the modulation system with new successive digital video data determined based on the successive initial digital video data, corresponding to the image which would be displayed based on the initial digital video data for a scanning of the display screen along lines inclined with respect to the reference direction by a second angle opposite to the first angle.

According to an embodiment of the present invention, the means for providing the new successive digital video data comprises means for calculating the new digital video data based on initial digital video data stored in the storage means and associated with distinct scanned lines of the screen; and means for successively providing the modulation system, for each scanned line of the screen, with the new digital video data associated with the scanning of a line of the display screen upon completion of a dwell after the beginning of the line scanning.

According to an embodiment of the present invention, the device comprises means for setting the second angle.

The foregoing objects, features, and advantages of the present invention, will be discussed in detail in the following non-limiting description of specific embodiments in connection with the accompanying drawings.

DETAILED DESCRIPTION

The present invention comprises modifying the content of the pixel data associated with the displayed image rather than correcting the inclination of the scanned lines of the screen. In other words, the image is still displayed with an unwanted rotation angle. However, the displayed image no longer corresponds to the initial image received by the display terminal, but to a new image determined from the initial image to be displayed so that the new image, displayed with an angle rotation, appears for a spectator as would appear the initial image with a non-defective scanning.

Figure 1:
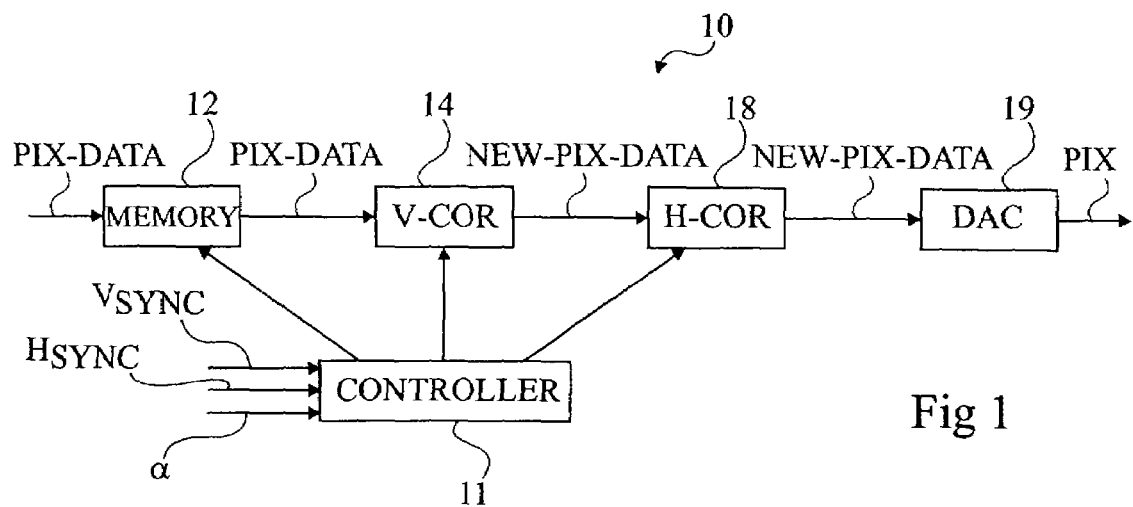
FIG. 1 schematically shows an example of the forming of a device according to the present invention providing pixel data to an electron beam modulation system.

FIG. 1 shows, in the form of a block-diagram, an example of the forming of a device 10 according to the present invention equipping a display terminal and transmitting control signals to a modulation system (not shown). The modulation system provides signals for modulating the intensity of electron beams emitted by electron guns and scanning a screen of the display terminal.

Device 10 comprises a controller 11 receiving an angle signal $\alpha$ indicating the angle correction to be made. This angle is equal to the opposite of the inclination angle of the lines scanned on screen with respect to the horizontal direction. The inclination of the scanned lines with respect to the horizontal direction can be determined by any type of adapted sensor which provides the value of angle $\alpha$ to controller 11. The value of angle $\alpha$ may also be set by the user of the display terminal by means of a setting control. Controller 11 receives a square pulse synchronization signal $V_{SYNC}$, each rising edge of which corresponds to the beginning of the scanning of the first screen line. Controller 11 receives a square pulse synchronization signal $H_{SYNC}$, each rising edge of which corresponds to the beginning of a line scanning.

Controller 11 controls a memory 12, in which are stored digital pixel data PIX_DATA. As an example, each of digital pixel data PIX_DATA is representative of an intensity value of a red, green, or blue component of a pixel of the image to be displayed. The pixel data PIX_DATA stored in memory 12 correspond to all or part of the pixel data necessary to display an image on screen. In the case where the display terminal is a television set, the pixel data PIX_DATA are determined based on the image signal received by the television set.

Device 10 comprises a first correction unit (V_COR) 14 which is adapted to reading from memory 12, according to control signals transmitted by controller 11, specific pixel data from the set of pixel data stored in memory 12. First corrector 14 determines from the selected specific pixel data and from coefficients transmitted by controller 11 new digital pixel data NEW_PIX_DATA and stores them in a memory area.

Device 10 comprises a second correction unit (H_COR) 18 which is adapted to reading from first correction unit 14 the new digital pixel data NEW_PIX_DATA and to transmitting the read pixel data to a digital-to-analog converter (ADC) 19 according to a determined sequence based on coefficients transmitted by controller 11.

Digital-to-analog converter 19 converts the new digital pixel data NEW_PIX_DATA into analog signals PIX. Analog signals PIX are then transmitted to the modulation system which determines, therefrom, the signals of modulation of the electron beam intensity.

The steps of the display correction method according to the present invention will now be described in detail.

Figure 2:
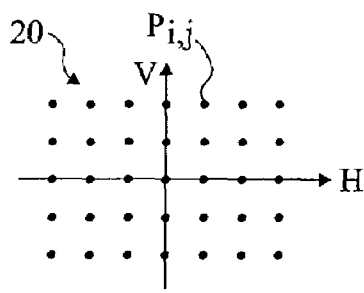
FIG. 2 schematically shows an example of a network of pixel data received by the device of FIG. 1.

FIG. 2 shows a network 20 of points $P_{i,j}$, i ranging from 0 to N, and j ranging from 0 to M, where N and M respectively represent the number of lines and columns of network 20. A point $P_{i,j}$ of network 20 represents a pixel datum, more specifically the necessary datum enabling generation of a modulation signal for the display of a color component of a pixel on screen. There exists a network similar to that of FIG. 2 for each color component. Hereafter, pixel data of the same color component only will be considered. Each line of network 20 corresponds to a line of the image to be displayed upon scanning of a screen line by the electron beams. In the example of FIG. 2, network 20 comprises pixel data for the display of five lines, with seven pixels per line. As a comparison, a screen generally comprises more than 300 lines and more than 700 pixels per line, only half of the screen lines being generally scanned at once in a screen scanning.

Call (H, V) an orthonormated referential, the axes of which are parallel, respectively, to the lines and to the columns of network 20 and centered on the screen center. In this referential, a point $P_{i,j}$ has coordinates $P_{i,j}(H\_P_{i,j}; V\_P_{i,j})$. It will be considered hereafter that the lines and columns of network 20 are separated by one unit in referential (H, V).

Figure 3:
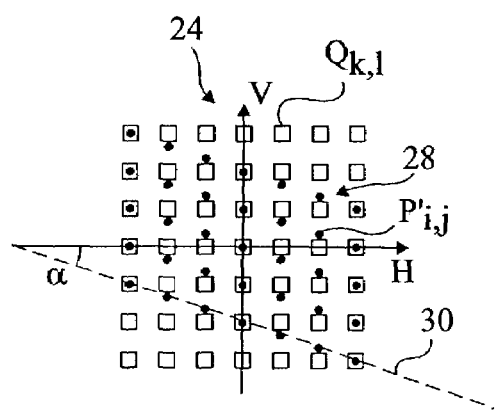
FIG. 3 schematically shows a first step of the display correction method according to the present invention.

FIG. 3 shows a network 24 of squares $Q_{k,l}$, k varying from 0 to R, and l varying from 0 to N, where R and N respectively represent the number of lines and columns of network 24. Network 24 has the same number N of columns as network 20 and has a higher number of lines R. Network 24 very schematically symbolizes the network of new pixel data NEW_PIX_DATA generated by first corrector 14. A square $Q_{k,l}$ of network 24 has coordinates $Q_{k,l}(H\_Q_{k,l}; V\_Q_{k,l})$ in referential (H, V).

In FIG. 3, a network 28 of points $P'_{i,j}$ is shown as being superposed to network 24 of squares $Q_{k,l}$. Network 28 of points $P'_{i,j}$ represents the theoretical deformation which is desired to be applied to network 20 of FIG. 2. This theoretical deformation consists of shifting each column j of network 20 along direction V by a different distance for each column so that each line of network 20 appears to be inclined by an angle $\alpha$, expressed in radian, with respect to direction H. Straight dotted line 30 represents the desired direction of a line of network 28.

Controller 11 determines the new theoretical coordinates of points P'$_{i,j}$ of network 28 based on the coordinates of the corresponding points P$_{i,j}$ of network 20. The coordinates of a point P'$_{i,j}$ of network 28 transformed from point P$_{i,j}$ of network 20 are P'$_{i,j}$(H_P$_{i,j}$; V_P$_{i,j}$+H_P$_{i,j}$*α) for small angles α.

For each point P'$_{i,j}$, controller 11 determines points Q$_{SUPk+1,j}$ and Q$_{INFk,j}$ of the same column j on either side of point P'$_{i,j}$ or, if such is the case, point Q$_{k,j}$ superposed to point P'$_{i,j}$. The coordinates of points Q$_{SUP}$ and Q$_{INF}$ are:

Q$_{SUPk+1,j}$(H_P$_{i,j}$; V_P$_{i,j}$+Ent(H_P$_{i,j}$*α)+1)

Q$_{INFk,j}$(H_P$_{i,j}$; V_P$_{i,j}$+Ent(H_P$_{i,j}$*α))

where Ent(H_P$_{i,j}$*sin α) is equal to the integral part of H_P$_{i,j}$*sin α.

Controller 11 controls first corrector 14 to assign the pixel data represented by square Q$_{SUPk+1,j}$ (respectively Q$_{INFk,j}$) a value which corresponds to a weighting of the value of the pixel data represented by point P'$_{i,j}$ according to the distance separating point P'$_{i,j}$ from square Q$_{SUPk+1,j}$ (respectively Q$_{INFk,j}$). This operation is repeated for all points P'$_{i,j}$ to obtain network 24 of new pixel data NEW_PIX_DATA. The value of new pixel data NEW_PIX_DATA is thus equal to a weighted sum of two initial pixel data PIX_DATA, or equal to the value (possibly weighted) of initial pixel data PIX_DATA, or equal to a value corresponding to a zero pixel color component intensity.

It is possible not to calculate all the new pixel data NEW_PIX_DATA of network 24, to reduce the memory space taken up by the new pixel data NEW_PIX_DATA.

In practice, first corrector 14 may select from memory 12 groups of pixel data PIX_DATA which correspond to several sets of points P'$_{i,j}$ of different lines, each set containing for each line points of same successive columns. First corrector 14 then calculates the values of the new pixel data NEW_PIX_DATA which are associated with the sets of points P'$_{i,j}$.

Second corrector 18 reads from first corrector 14 each line of new pixel data NEW_PIX_DATA. Upon reception of a rising edge of synchronization signal V$_{SYNC}$, controller 11 transmits to second corrector 18 dwell values ΔTk associated with each line k of network 28 and which are a function of angle α. The theoretical dwell ΔT$_{i,j}$ associated with point P'$_{i,j}$ is given by the following formula:

$$\Delta T_{i,j} = -V\_P_{i,j} \cdot \alpha \cdot \frac{T_{Huseful}}{2(H\_P_{i,j})_{MAX}}$$

where T$_{Huseful}$ is the duration of the visible portion of a line on screen, (H_P$_{i,j}$)$_{MAX}$ is the maximum ordinate of points P$_{i,j}$. Dwell ΔTk associated with each line k of network 24 may be obtained by interpolating dwells ΔT$_{i,j}$, with a fixed j.

At each rising edge of synchronization signal H$_{SYNC}$, second corrector 18 waits for the completion of dwell ΔTk before starting the transmission to converter 19 of the new pixel data NEW_PIX_DATA of line k.

Figure 4:
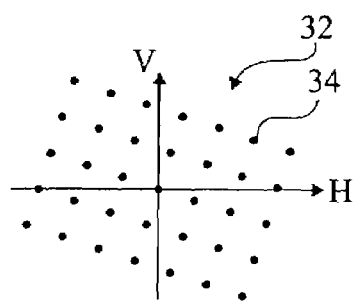
FIG. 4 schematically shows a second step of the correction method according to the present invention.

FIG. 4 shows a network 32 of points 34 symbolizing the pixel distribution on the display screen based on the new pixel data NEW_PIX_DATA transmitted to the modulation system according to the method of the present invention in the case where the screen scanning would have no rotation defect. For a spectator, the image displayed on screen would then substantially correspond to the initial image which would have undergone an angle rotation α.

Since the screen scanning submits the displayed images to an angle rotation opposite to angle α, the image displayed on screen, corresponding to the new pixel data NEW_PIX_DATA, actually appear for the spectator similarly to the initial image corresponding to the pixel data PIX_DATA in the absence of a rotation.

The present invention has many advantages.

First, the present invention avoids adding a coil type compensation system. It thus enables reducing the manufacturing cost of the display terminal.

Second, the present invention enables accurate correction of the deformation of the displayed image, since upon construction of network 24 of new pixel data NEW_PIX_DATA from network 20 of initial pixel data PIX_DATA, any shifting may be assigned to any column j of network 20. Further, upon transmission of the new pixel data NEW_PIX_DATA to converter 19, any dwell may be assigned to each transmitted line.

Of course, the present invention is likely to have various alterations, modifications, and improvements which will readily occur to those skilled in the art. In particular, the present invention may apply to display terminals of computer monitor type, automatic teller machine screen, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for correcting the rotation of a video image display on a display screen by a scanning of the display screen according to lines inclined by a first angle with respect to a reference direction, the screen being scanned by at least one electron beam modulated by a modulation signal provided by a modulation system based on successive digital video data, comprising the steps of:
   (a) storing successive initial digital video data associated with the image to be displayed; and
   (b) transmitting to the modulation system new successive digital video data determined based on the successive initial digital video data, corresponding to the image which would be displayed from the initial digital video data for a scanning of the display screen according to lines inclined with respect to the reference direction by a second angle opposite to the first angle, wherein step (b) comprises the steps of:
   (c) determining each of the new digital video data based on initial digital video data associated with distinct scanned lines of the screen; and
   (d) successively transmitting to the modulation system, for each scanned line of the screen, the new digital video data associated with the scanning of a line of the display screen at the end of a dwell after the beginning of the line scanning, wherein at step (d), the dwell is a function of the scanned line and of the second angle.

2. The method of claim 1, wherein step (c) comprises repeating of the steps of:
   extracting, from among the successive initial digital video data, first and second groups of successive initial digital video data comprising a determined number of successive initial digital video data and located at the same position in the sequence of successive initial digital video data associated with two successive scanned lines of the screen; and determining the determined number of new digital video data, each of the new digital video data corresponding to the weighting of one of the initial digital video data of the first group and of one of the initial digital video data of the second group.

3. The method of claim 2, wherein the number of successive initial digital video data of each group of successive initial digital video data is a function of the second angle.

4. The method of claim 1, wherein each of the digital video data corresponds to an intensity of a color component of a pixel to be displayed on the display screen.

5. The method of claim 1, wherein the method corrects the rotation of the video image caused by a defect in manufacturing the device and/or by a magnetic field present during use of the device.

6. A device for displaying a video image on a display screen by a scanning of the display screen along lines inclined by a first angle with respect to a reference direction, the screen being scanned by at least one electron beam modulated by a modulation signal provided by a modulation system based on successive digital video data, comprising:

means for storing successive initial digital video data;

means for providing the modulation system with new successive digital video data determined based on the successive initial digital video data, corresponding to the image which would be displayed based on the initial digital video data for a scanning of the display screen along lines inclined with respect to the reference direction by a second angle opposite to the first angle, wherein the means for providing:

determines each of the new digital video data based on initial digital video data associated with distinct scanned lines of the screen; and successively transmits to the modulation system, for each scanned line of the screen, the new digital video data associated with the scanning of a line of the display screen at the end of a dwell after the beginning of the line scanning, wherein the dwell is a function of the scanned line and of the second angle.

7. The device of claim 6, wherein the means for providing the new successive digital video data comprises:

means for calculating the new digital video data based on initial digital video data stored in the storage means and associated with distinct scanned lines of the screen; and means for successively providing the modulation system, for each scanned line of the screen, with the new digital video data associated with the scanning of a line of the display screen upon completion of a dwell after the beginning of the line scanning.

8. The device of claim 6, further comprising means for setting the second angle.

9. The device of claim 6, wherein the device corrects a rotation of a video image on a display screen.

10. The device of claim 9, wherein the rotation is caused by a deflection of an electron beam that creates the video image on the display screen.

11. The device of claim 9, wherein the device corrects a rotation of the video image caused by a defect in manufacturing the device and/or by a magnetic field present during use of the device.

* * * * *

UNITED STATES PATENT AND TRADEMARK OFFICE
CERTIFICATE OF CORRECTION

PATENT NO. : 7,369,144 B2  Page 1 of 1
APPLICATION NO. : 10/409530
DATED : May 6, 2008
INVENTOR(S) : Benoit Marchand et al.

It is certified that error appears in the above-identified patent and that said Letters Patent is hereby corrected as shown below:

On the Title Page:
Item (73) should read:
(73) Assignee:   STMicroelectronics S.A., Montrouge (FR)

Signed and Sealed this

Twenty-third Day of December, 2008

JON W. DUDAS
*Director of the United States Patent and Trademark Office*